United States Patent
Karp et al.

(10) Patent No.: US 11,846,447 B2
(45) Date of Patent: Dec. 19, 2023

(54) ULTRASONIC HUMIDIFIER WITH EXTERNAL CLEANING COMPATIBILITY

(71) Applicant: Aireau Labs Corporation, Los Angeles, CA (US)

(72) Inventors: Michael Karp, Los Angeles, CA (US); Hilary Farnsworth, New Rochelle, NY (US); Gianfranco Bonanome, Massapequa, NY (US)

(73) Assignee: AIREAU LABS CORPORATION, Los Angeles, CA (US)

( * ) Notice: Subject to any disclaimer, the term of this patent is extended or adjusted under 35 U.S.C. 154(b) by 126 days.

(21) Appl. No.: 17/572,551

(22) Filed: Jan. 10, 2022

(65) Prior Publication Data

US 2023/0076004 A1   Mar. 9, 2023

Related U.S. Application Data

(60) Provisional application No. 63/241,969, filed on Sep. 8, 2021.

(51) Int. Cl.
*F24F 6/14* (2006.01)
*F24F 13/20* (2006.01)
(Continued)

(52) U.S. Cl.
CPC ............ *F24F 6/14* (2013.01); *F24F 11/0008* (2013.01); *F24F 13/20* (2013.01); *F24F 2006/008* (2013.01); *F24F 2006/143* (2013.01)

(58) Field of Classification Search
CPC .... F24F 2006/008; F24F 6/12; F24F 11/0008; F24F 13/20; F24F 6/14; F24F 2006/146; F24F 2006/143
See application file for complete search history.

(56) References Cited

U.S. PATENT DOCUMENTS 4,641,053 A * 2/1987 Takeda ................ B05B 17/0615
                                                                310/317
6,427,984 B1   8/2002 Mulvaney et al.
(Continued)

FOREIGN PATENT DOCUMENTS

CA         2330250        7/2001
CN       201006528        1/2008
(Continued)

OTHER PUBLICATIONS

KR20170053311A Translation (Year: 2017).*
(Continued)

*Primary Examiner* — Schyler S Sanks

(57) ABSTRACT

A humidifier includes a first housing removably connected to a second housing that includes the majority of the electrical components of the humidifier. The first housing includes a first air inlet for accepting air; a first air outlet; a central chamber for holding water; a piezoelectric transducer installed in the central chamber for atomizing water; and a first electrical connector electrically connected to the piezoelectric transducer. The first housing is configured to discharge humidified air from the first air outlet. The second housing includes a second air outlet removably connectable to the first air inlet; a forced air source for forcing air out of the second air outlet; a second electrical connector configured to removably electrically connect to the first electrical connector; and an electric circuit electrically coupled to the forced air source for electrically powering the forced air source and electrically coupled to the second electrical connector for electrically powering the piezoelectric transducer.

15 Claims, 14 Drawing Sheets

(51) Int. Cl.
  *F24F 11/00*  (2018.01)
  *F24F 6/00*  (2006.01)

(56) References Cited

U.S. PATENT DOCUMENTS

| | | | |
|---|---|---|---|
| 8,296,993 | B2 | 10/2012 | Modlin et al. |
| 8,544,825 | B2 | 10/2013 | Lee et al. |
| 2016/0326765 | A1* | 11/2016 | Barbret .................... E04H 15/02 |
| 2019/0041075 | A1* | 2/2019 | Sarkar ...................... F24F 11/62 |
| 2019/0226704 | A1* | 7/2019 | Lundgreen ............... F24F 11/30 |

FOREIGN PATENT DOCUMENTS

| | | | | |
|---|---|---|---|---|
| DE | 102007001442 | | 8/2008 | |
| EP | 3722688 | A1 * | 10/2020 | ............. F24F 11/88 |
| JP | 2016040508 | | 3/2016 | |
| KR | 101381948 | B1 * | 4/2014 | |
| KR | 20170053311 | A * | 5/2017 | |

OTHER PUBLICATIONS

KR101381948B1 Translation (Year: 2014).*
Machine Translation of CN201006528, Jan. 16, 2008.
Machine Translation of DE102007001442, Aug. 14, 2008.
Machine Translation of JP2016040508, Mar. 24, 2016.

* cited by examiner

ULTRASONIC HUMIDIFIER WITH EXTERNAL CLEANING COMPATIBILITY

CROSS-REFERENCE TO RELATED APPLICATIONS

This application claims the benefit of U.S. Provisional Application No. 63/241,969, filed Sep. 8, 2021, the contents of which are incorporated herein by reference.

BACKGROUND OF THE INVENTION

1. Field of the Invention

The present invention generally relates to humidifiers. In particular, various embodiments of the present invention relate to humidifiers that may be easily disassembled for cleaning and servicing purposes.

2. Description of the Related Art

Ultrasonic humidifiers are rapidly becoming a standard, with expanding use cases into other fields, such as insect repelling. There is a long-felt need in the field for an ultrasonic humidifier that is easily kept clean, as these devices get dirty and can grow harmful bacteria. Innovation in this area has typically focused on coatings, materials science, and chemical reactions to limit bacteria growth.

Ultrasonic humidifiers with integrated water tanks are available on the commercial market in many different shapes and colors. These water tanks are difficult to clean and not interchangeable, and the working components of the humidifier are a potential haven for bacterial growth. If the water tank is damaged, or the piezo electronic device gets damaged, the entire unit is no longer usable.

There thus exists a need for humidifiers that can be more easily cleaned and serviced.

SUMMARY OF THE INVENTION

In various embodiments a humidifier includes a first housing removably connected to a second housing that includes the majority of the electrical components of the humidifier. The first housing includes a first air inlet for accepting air; a first air outlet; a central chamber for holding water; a piezoelectric transducer installed in the central chamber for atomizing water; and a first electrical connector electrically connected to the piezoelectric transducer. The first housing is configured to discharge humidified air from the first air outlet. The second housing includes a second air outlet removably connectable to the first air inlet; a forced air source for forcing air out of the second air outlet; a second electrical connector configured to removably electrically connect to the first electrical connector; and an electric circuit electrically coupled to the forced air source for electrically powering the forced air source and electrically coupled to the second electrical connector for electrically powering the piezoelectric transducer.

In various embodiments, the piezoelectric transducer is removably installed in the central chamber.

In certain embodiments the first housing includes a water inlet for accepting water and providing the water to the central chamber and a valve fluidly coupled to the water inlet for controlling a flow of water received from the water inlet. In variations thereof, the valve may include a valve control for controlling flow of the water through the valve and the second housing includes a valve coupler configured to mechanically engage with and drive the valve control. The valve control and valve coupler may have corresponding shapes to releasably engage with each other. In yet further refinements, the second housing may include a motor configured to drive the valve coupler, and the motor is electrically coupled to and controlled by the electric circuit. In yet another refinement thereof, the electric circuit may be configured to control the motor according to a water level signal. In such embodiments, the first housing may include a third electrical connector and a water level detector, with the water level detector configured to detect a level of water in the central chamber and output the water level signal on the third electrical connector according to the detected level of water, and the second housing may include a fourth electrical connector configured to removably electrically connect to the third electrical connector and provide the water level signal to the electric circuit.

In various embodiments the second housing has a shape keyed to a shape of the first housing.

In other embodiments, the first housing further includes a removable top cover to cover the central chamber, and the first air outlet is disposed on the top cover. In some embodiments the first air outlet is movably disposed on the top cover. In other embodiments, the first housing and the top cover together define a first air channel for accepting air from the first air inlet and providing the air into the central chamber. In some variations thereof, at least a portion of the first air channel is disposed on a sidewall of the central chamber.

In certain embodiments a latch is used for releasably connecting the first housing to the second housing.

In some embodiments, the water inlet comprises a quick disconnect for removably coupling to a water source.

In various other embodiments electric circuit includes a central processing unit programmed to control operations of the humidifier and a power conditioner configured to accept power from an electrical power source and to output conditioned power suitable for use by the central processing unit, the forced air source, and the piezoelectric transducer. In certain refinements the electric circuit further includes a wireless circuit configured for wirelessly communicating with an external device to control operations of the humidifier.

BRIEF DESCRIPTION OF THE DRAWINGS

The various aspects and embodiments disclosed herein will be better understood when read in conjunction with the appended drawings, wherein like reference numerals refer to like components. For the purposes of illustrating aspects of the present application, there are shown in the drawings certain preferred embodiments. It should be understood, however, that the application is not limited to the precise arrangement, structures, features, embodiments, aspects, and devices shown, and the arrangements, structures, features, embodiments, aspects and devices shown may be used singularly or in combination with other arrangements, structures, features, embodiments, aspects and devices. The drawings are not necessarily drawn to scale and are not in any way intended to limit the scope of this invention, but are merely presented to clarify illustrated embodiments of the invention. In these drawings.

DETAILED DESCRIPTION OF THE PREFERRED EMBODIMENTS

Figure 1:
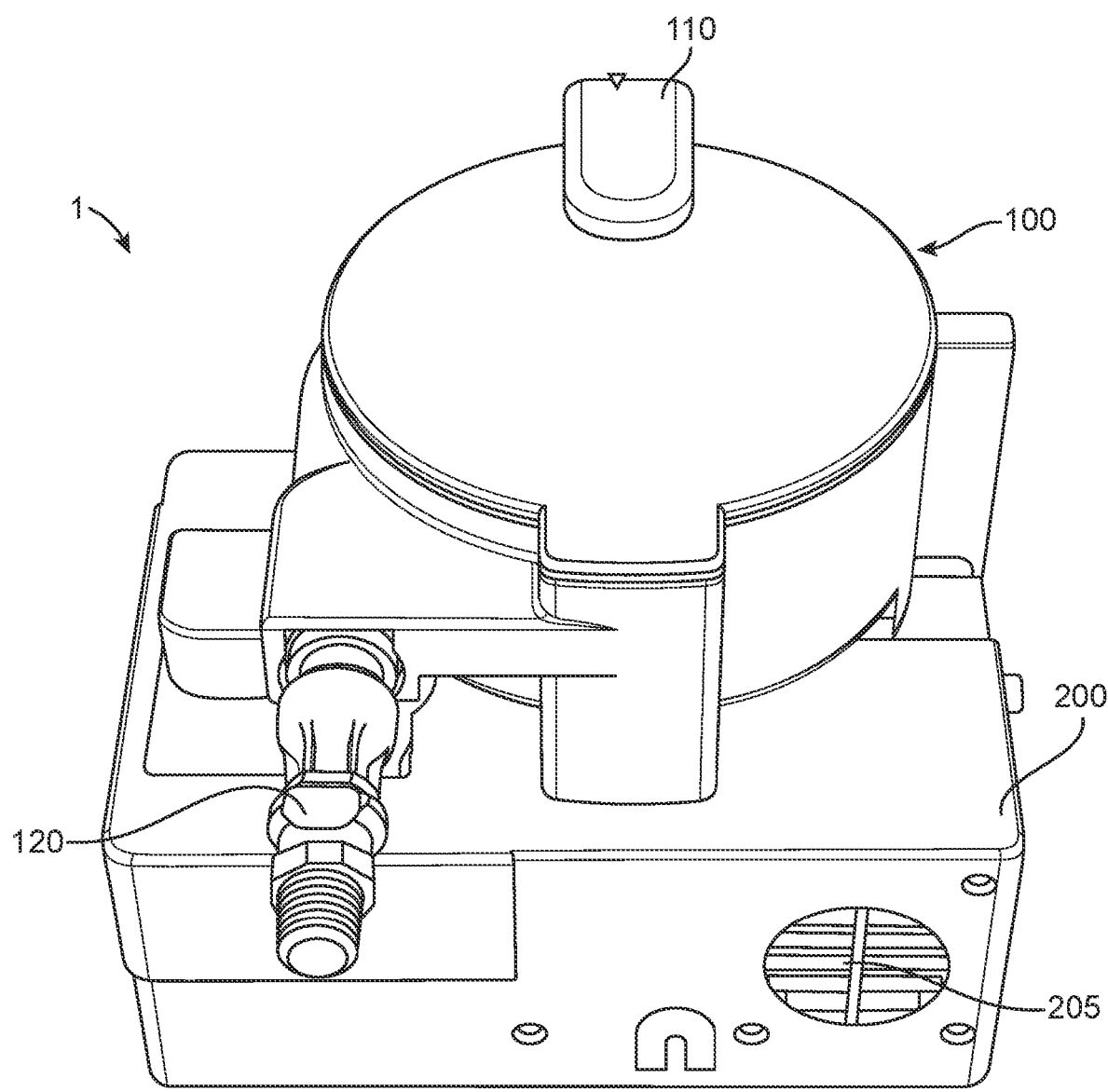
FIG. 1 is a perspective view of a humidifier according to a first embodiment.

With general reference to FIGS. 1-14, a humidifier 1 includes a piezo puck 100, which is a first housing body that houses all components of humidifier 1 that interact with water. Humidifier 1 also contains an electronics puck 200, which is a second housing body that contains all electronic components of humidifier 1 except for a piezoelectric transducer unit 190 used to create mist, as described in more detail below, which is disposed in piezo puck 100, and a water level sensor 198 used to sense the water level in piezo puck 100.

Piezo puck 100 is separable by a user from electronics puck 200. Piezo puck 100 can then be placed in its entirety into any commercially available dishwasher for cleaning. Piezo puck 100 engages with electronics puck 200, preferably locking into place with a mechanical latch 240 by interlocking with a notch 199 on the piezo puck 100 (shown in FIG. 12). However, any suitable latching mechanism may be used, or even none at all since the keyed fitting between electronics puck 200 and piezo puck 100 may be sufficient to ensure sufficient engagement between the two. Specifically, piezo puck 100 includes a base 103, and a bottom portion 102 of base 103 preferably has a shape that is keyed to a correspondingly-shaped receiving space 202 in electronics puck 200. Consequently, piezo puck 100 may only be insertable into electronics puck 200 one way, which is easily discernable by a user, thus facilitating easy separation and connection of piezo puck 100 with electronics puck 200. Once in position, latch 240 engages with notch 199 to lock piezo puck 100 and electronics puck 200 together.

Base 103 of piezo puck 100 is removably covered by top cover 105, such as by a mating fit, snap fit, or the like. A user may thus remove top cover 105 from base 103 when washing piezo puck 100.

Figure 10:
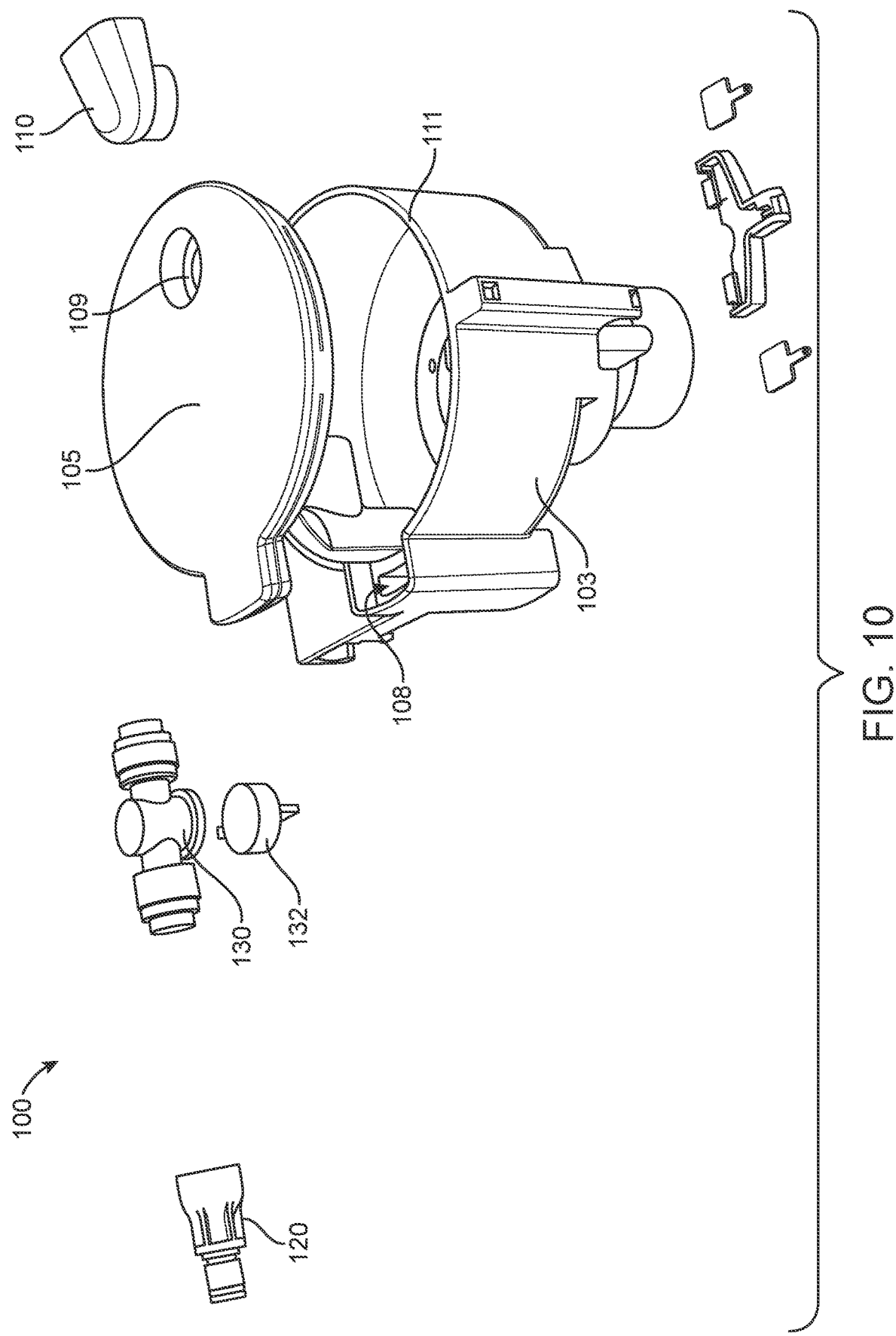
FIG. 10 is an exploded view of portions of the piezo puck according to the first embodiment.
Figure 11:
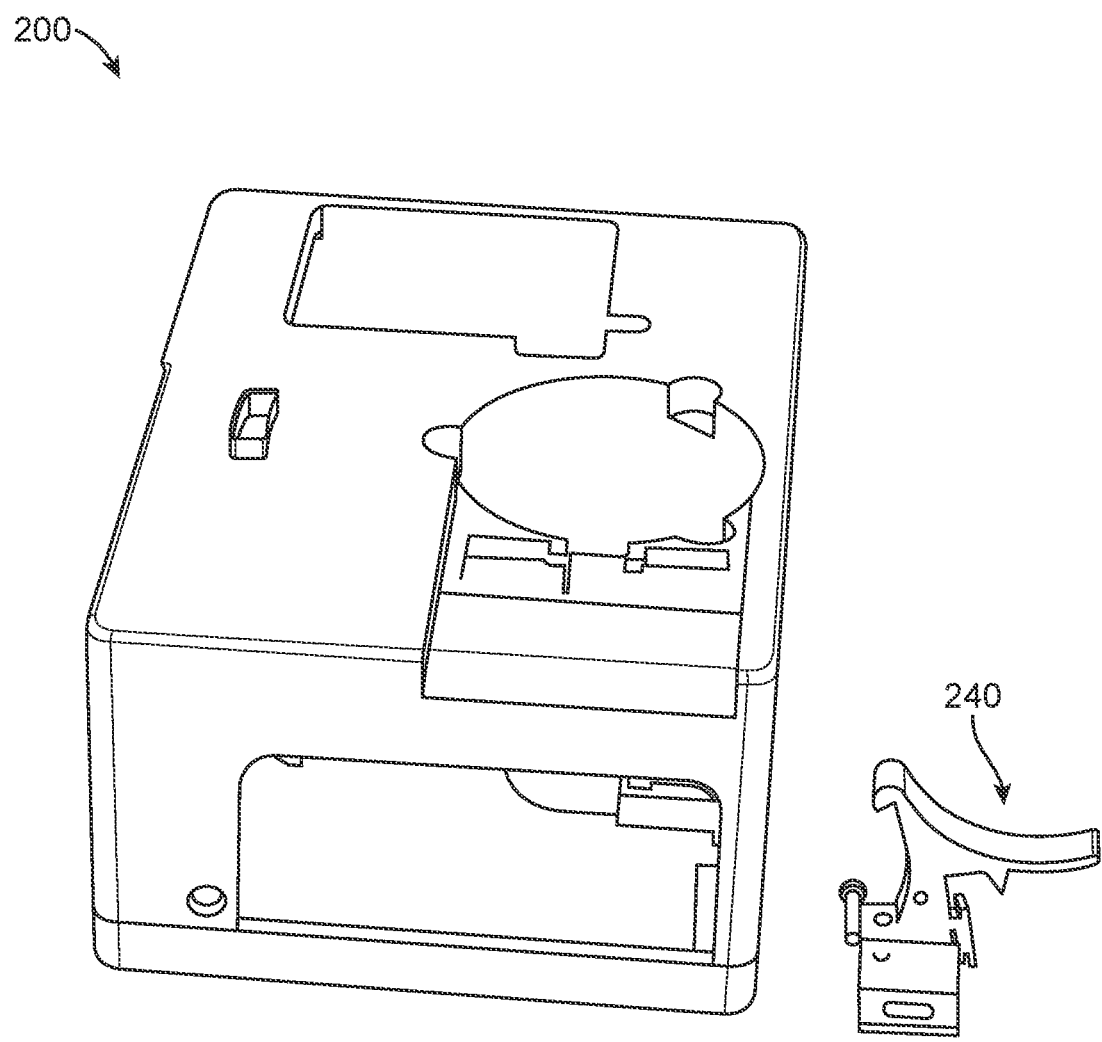
FIG. 11 is an exploded view of portions of the electronics puck according to the first embodiment.
Figure 12:
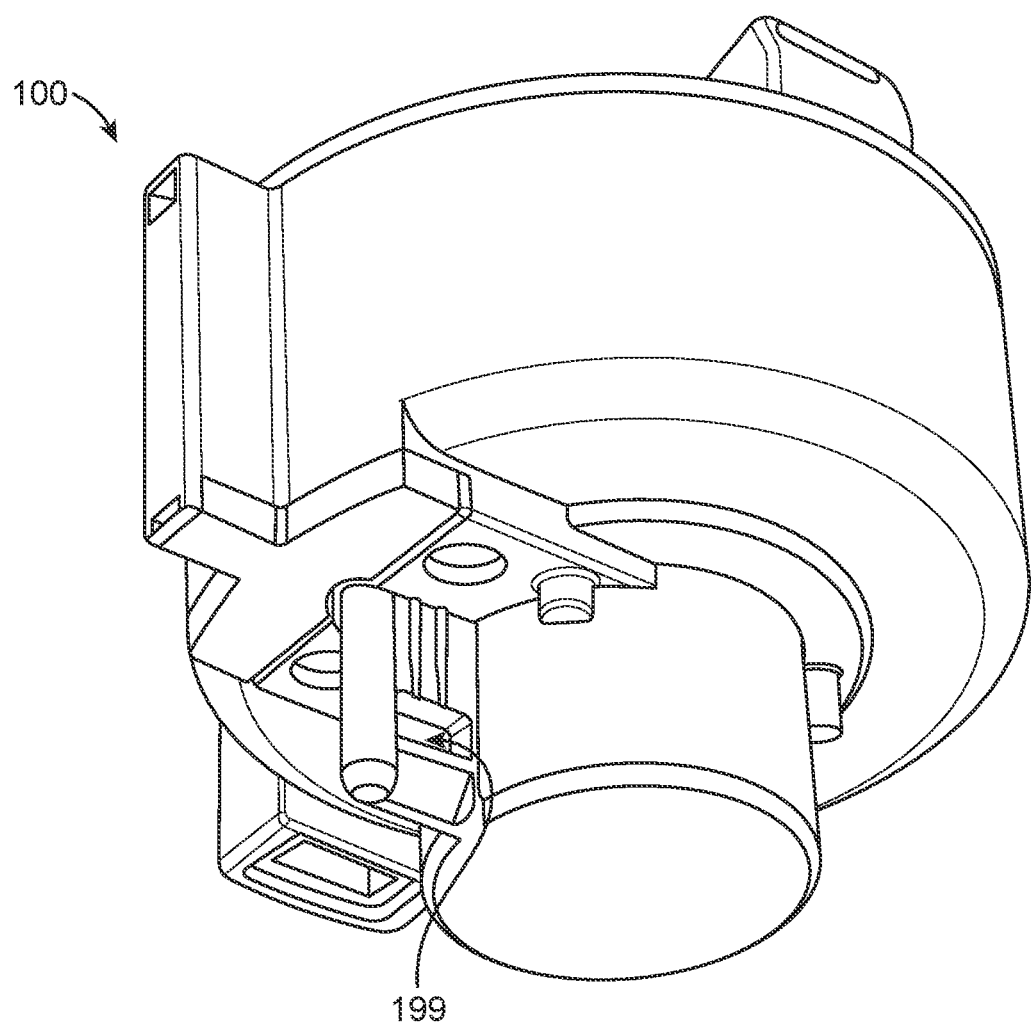
FIG. 12 is a perspective of the piezo puck according to the first embodiment.

With specific reference to FIG. 10, top cover 105 of piezo puck 100 includes a directional output manifold 110 to direct mist leaving humidifier 1. Directional output manifold 110 rotatably and fluidly couples with a second air channel 109 (discussed in more detail below) using any suitable coupling, such as a socket fitting. Alternatively, output manifold 110 could be permanently attached to top cover 105 of piezo puck with, for example, a tongue and groove style coupling, or being integrally formed thereon.

Figure 13:
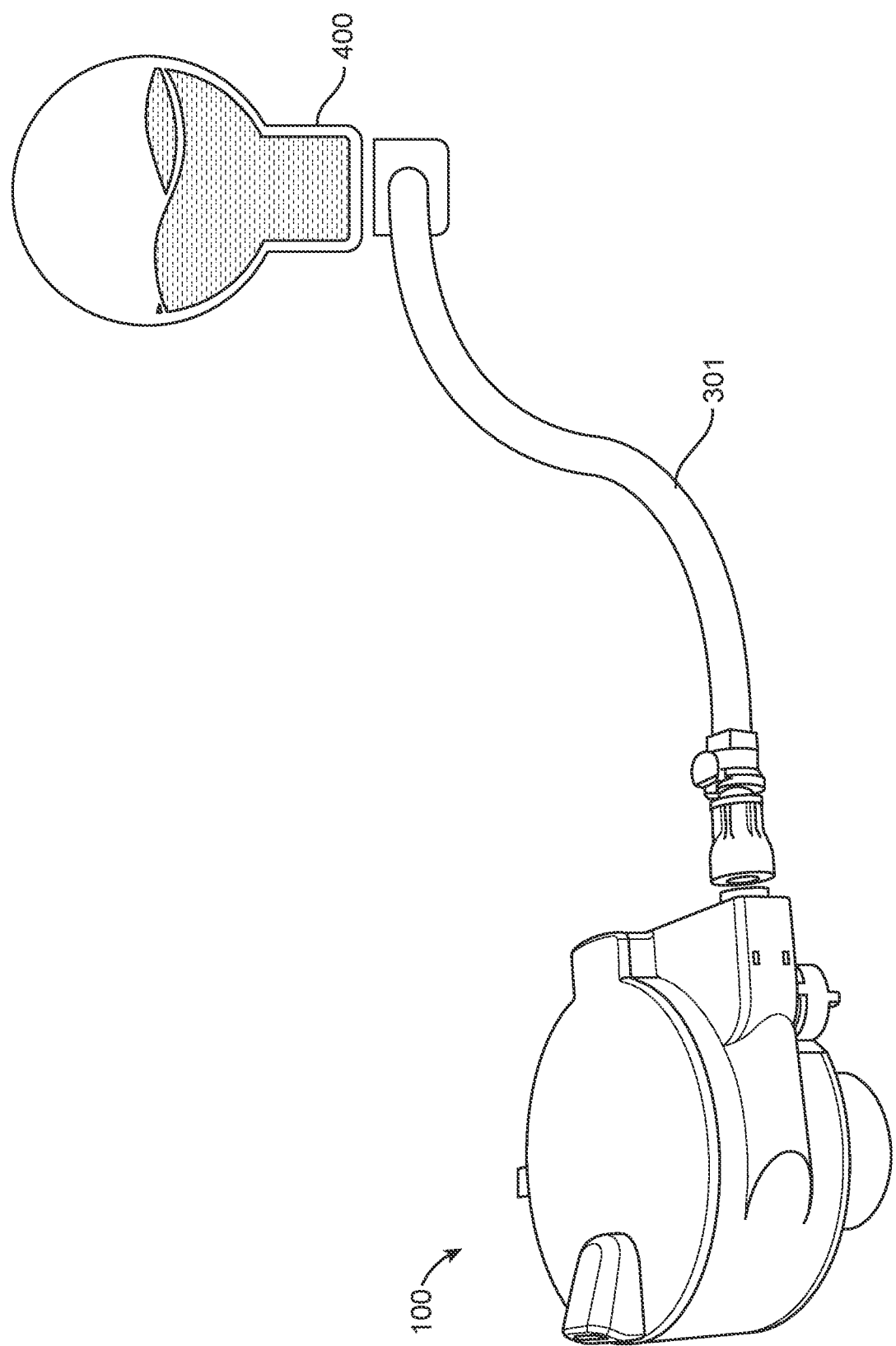
FIG. 13 is a perspective of the piezo puck interfacing with an optional water tank according to the first embodiment.

Piezo puck 100 further includes a water quick disconnect 120 that allows for differing types of water sources to be attached to humidifier 1, including an external tank or a direct water line hook-up. Any interlocking secure tubing connections are suitable, if they allow the end user to easily remove the water source from the piezo puck 100, ideally in a manner that also prevents the water from flowing when not connected. Such fittings are well-known in the art, such as shown at, for example, https://www.tubes-international-.com/products/industrial-fittings/quick-release-water-couplings. Any water tank 400, or bottle, can connect by any properly sized tubing 301 to the piezo puck 100, as shown in FIG. 13. Alternatively, quick disconnect 120 may be connected to a mains water supply via suitable tubing.

Figure 2:
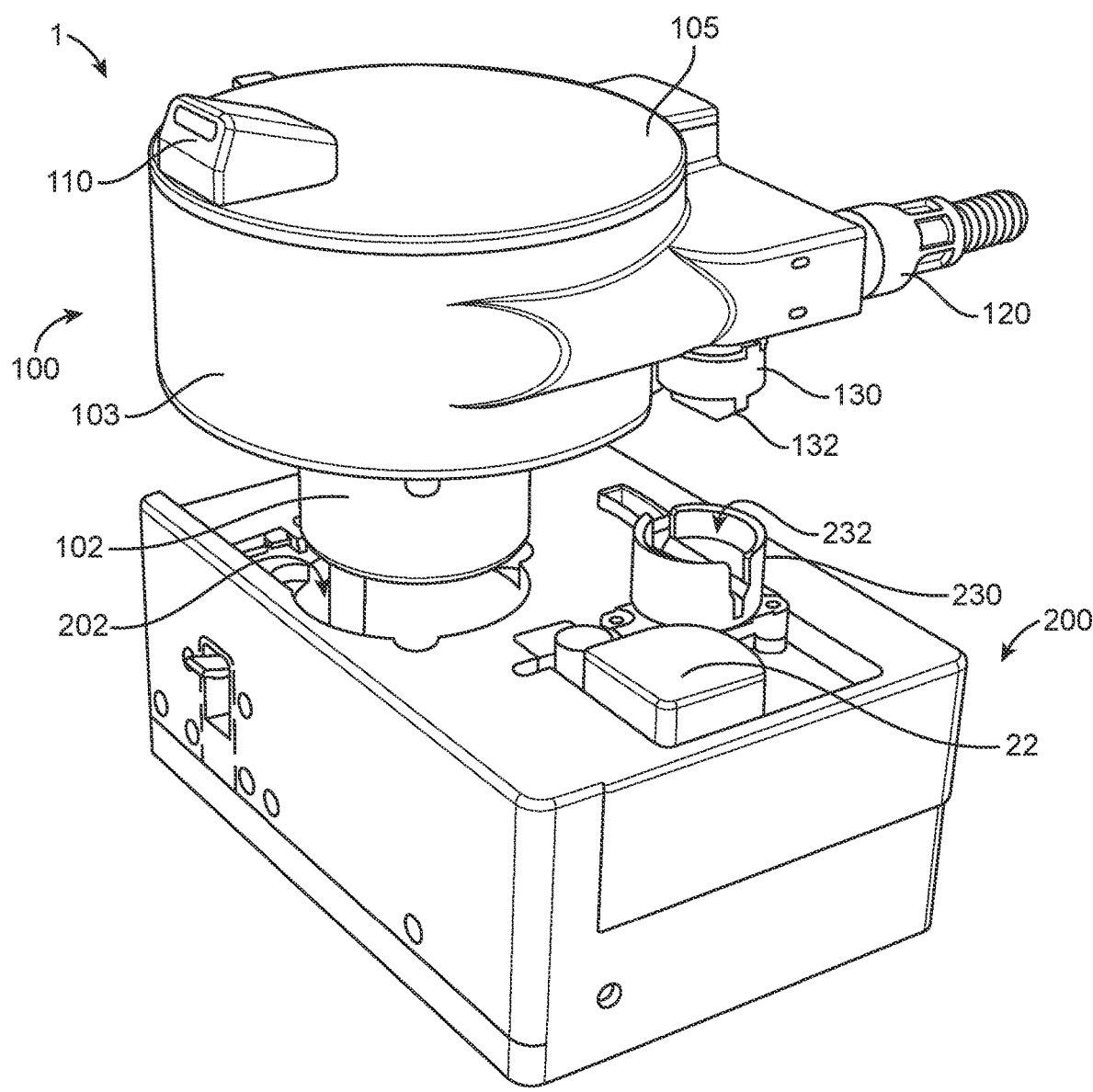
FIG. 2 is a perspective view of piezo and electronics pucks interlocking according to the first embodiment.
Figure 3:
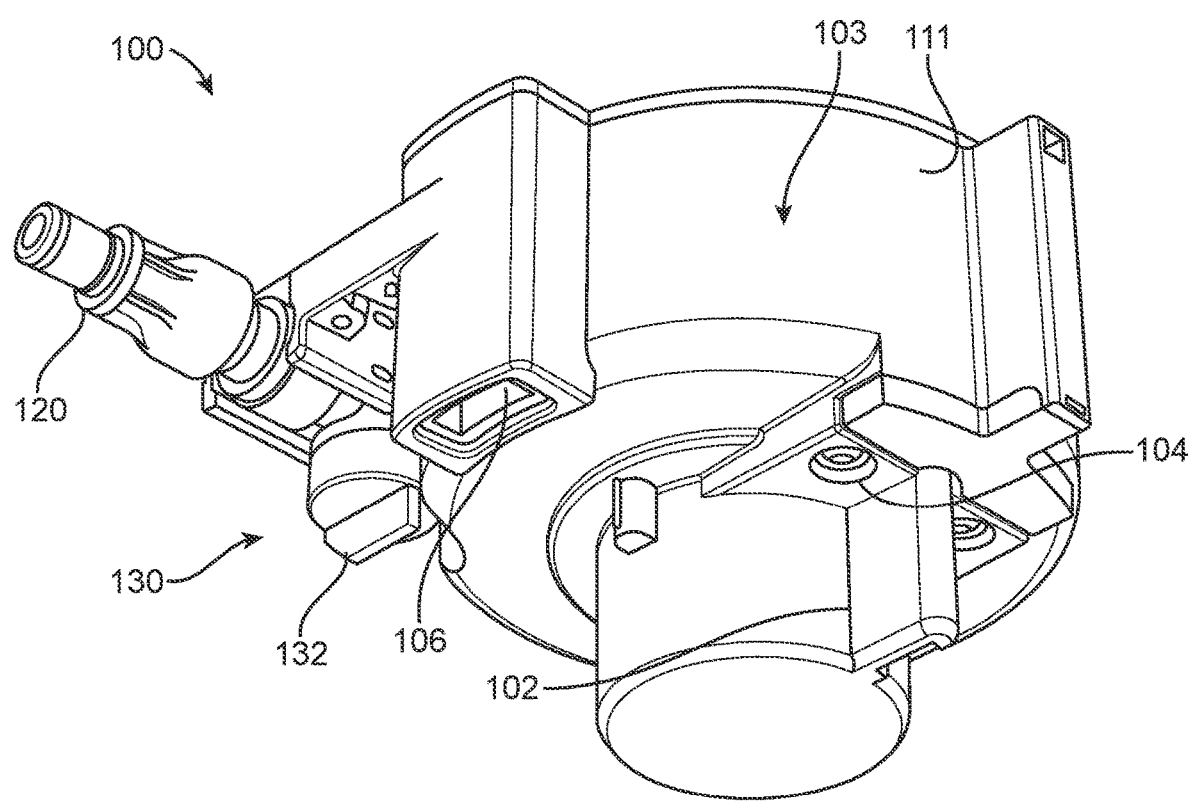
FIG. 3 is a perspective view of a piezo puck according to the first embodiment.
Figure 4:
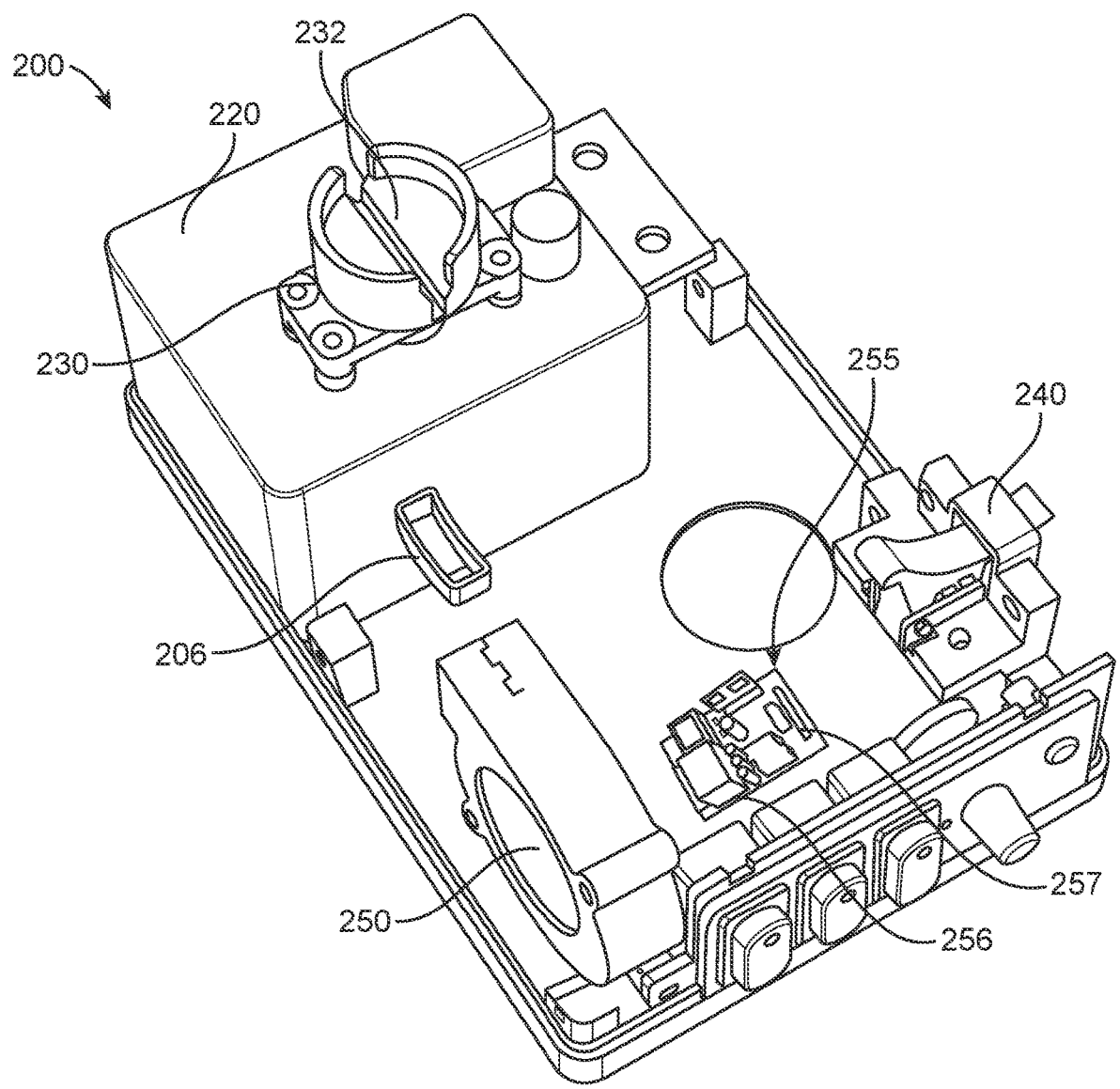
FIG. 4 is an internal view of portions of an electronics puck according to the first embodiment.
Figure 5:
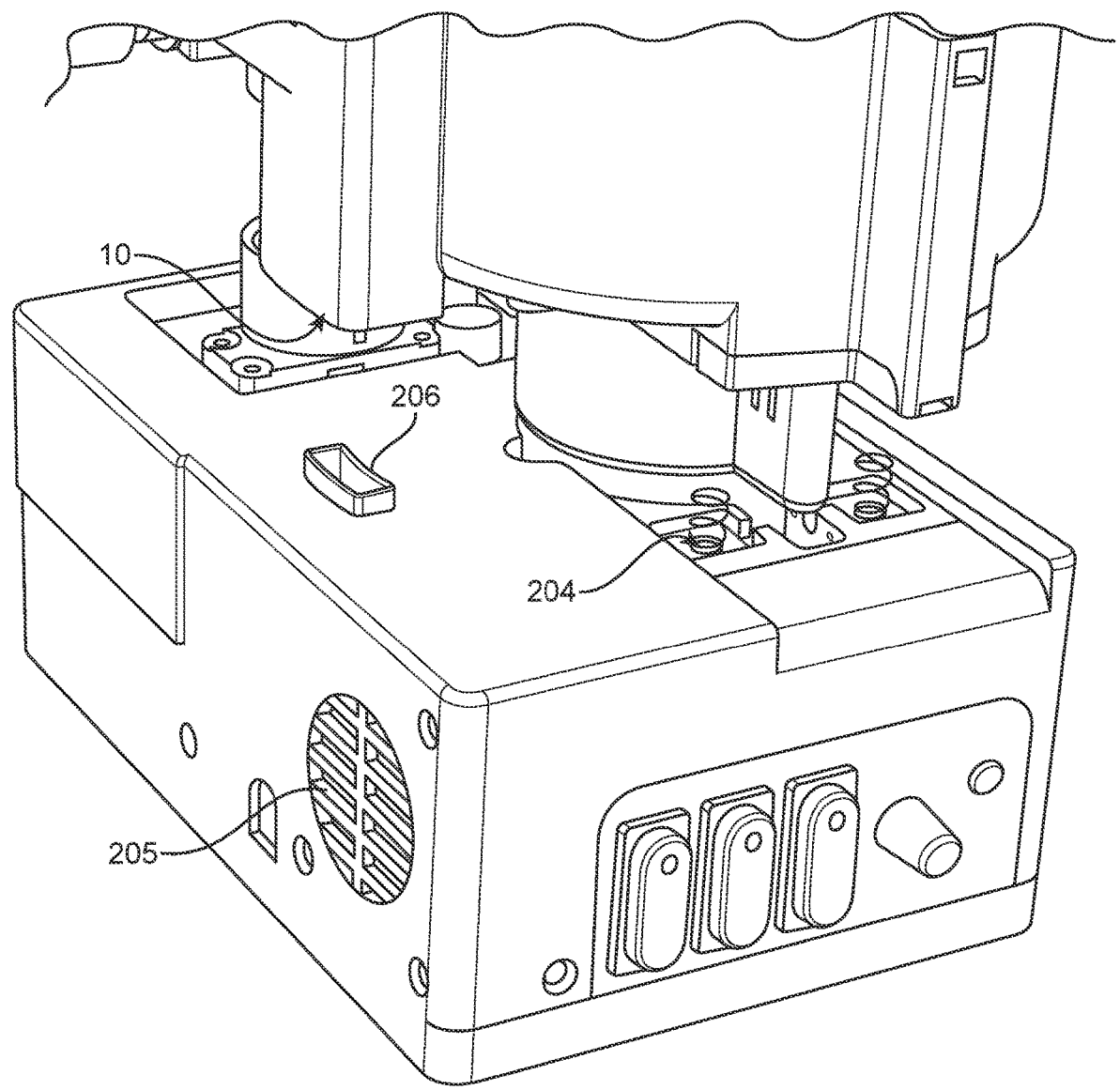
FIG. 5 is another perspective view of the first embodiment humidifier.

Piezo puck 100 includes a water valve 130, as shown in FIGS. 2 and 3, such as a ball valve or any other suitable valve, that is fluidly coupled to quick disconnect 120 to control the amount of water following into piezo puck 100. Water valve 130 is controlled by a valve coupler 230 on electronics puck 200. In a preferred embodiment, valve coupler 230 physically controls a position of valve 130, such as by mechanically rotating a valve control 132 (e.g., a valve stem or the like) of valve 130. In such embodiments, valve control 132 may physically connect to a connection portion 232 of valve coupler 230. Rotation or movement of connection portion 232 causes corresponding rotation or movement of valve control 132, thereby controlling the flow rate of water into piezo puck 100. Valve control 132 may have a shape that is keyed to a corresponding shape of connection portion 232. Such keyed shape preferably easily transfers torque generated by connection portion 232 to valve control 132, such as corresponding rectangular shapes, as shown in FIG. 2.

In a preferred embodiment, valve coupler 230 is rotated by an electric motor 220 disposed in electronics puck 200. Electric motor 220 is controlled and powered by an electrical control circuit 255 that is also disposed in electronics puck 200. Electrical control circuit 255 may be, for example, a printed circuit board that includes a one or more power conditioners for accepting electrical power from electrical mains, a battery, or the like and generate suitably conditioned electrical power for other electrical devices within humidifier 1, such as electric motor 220, air blower 250, piezoelectric transducer 300, etc. That is, the power conditioner (or conditioners) provides electric power of the proper voltage for each of the electric motor 220, air blower 250, piezoelectric transducer 300, and other components of the control circuit 255. Any suitable power conditioners known in the art may be used. Electrical control circuit 255 also includes a microprocessor 256 and a humidity sensor 257. The humidity sensor 257 is connected to the microprocessor 256 to provide real time information about the current humidity level in the air around the unit. While any commonly used printed circuit board materials will be sufficient, the most common is a flat sheet of insulating material with copper foil laminated. The electric motor 220, which may be a servo motor driving the ball valve 130, (such as shown, for example, at https://ussolid.com/motorized-ball-valves.html) is also connected to the microprocessor 256 to allow for water level control in piezo puck 100.

With specific reference to FIG. 3, base 103 of piezo puck 100 includes electric connectors 104 that releasably electrically couple to corresponding electric connectors 204

(shown in FIG. 5) on electronics puck 200 when piezo puck 100 is mated with electronics puck 200. Any suitable connectors 104, 204 may be employed. For example, electric connectors 104 may be conductive landing surfaces, while corresponding electric connectors 204 may be elastic conductors, such as springs or the like; alternatively, a pin and socket arrangement may be employed. These electric connectors 104, 204 allow the piezoelectric transducer within piezo puck 100 to be controlled by electrical control circuit 255 in electronics puck 200 and to provide sensing signals, such as from a water level sensor 198, to electrical control circuit 255. One pair of connectors 104, 204 may serve as a common ground.

Piezo puck 100 has an air inlet 106 defined in base 103 to accept air flow from air outlet 206 (shown in FIGS. 4 and 5) of electronics puck 200. Consequently, inlet 106 and outlet 206 are mutually configured to be in register with each other when piezo puck 100 is mated with electronics puck 200. Inlet 106 and outlet 206 may have any suitable mating arrangement, such as a male/female mating arrangement. Air flow for air outlet 206 is provided by a forced air source 250, such as a fan or air blower, located in electronics puck 200, which is controlled and powered by electrical control circuit 255. Air blower 250 is fluidly coupled to air outlet 206 to force air from air outlet 206 and thus into air inlet 106. An inlet 205 of air blower 250 obtains air from outside of humidifier 1 via a suitable inlet. A filter may optionally be placed at inlet 205 to filter the air prior to entering air blower 250.

Figure 6:
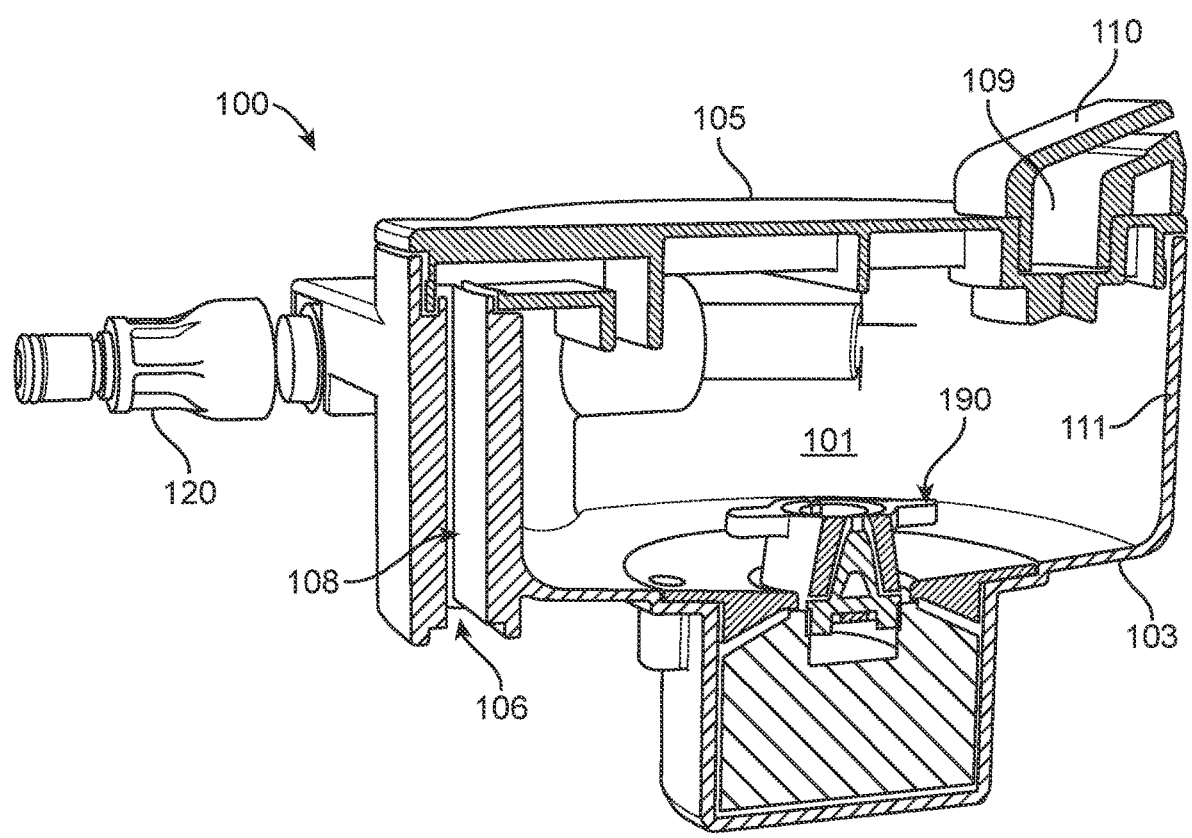
FIG. 6 is a perspective view of a cross-section of the piezo puck according to the first embodiment.

With specific reference to FIG. 6, base 103 of piezo puck 100 defines a central chamber 101 that houses piezoelectric transducer unit 190, and into which water flows, as controlled by valve 130, to be atomized by piezoelectric transducer unit 190. Central chamber 101 is covered by top cover 105 while humidifier 1 is in use. Base 103 and top cover 105 together define a first air channel 108 that fluidly couples air inlet 106 with central chamber 101 so that air from outlet 206 can flow into chamber 101 via first air channel 108 and air inlet 106. Hence, first air channel 108 includes a first portion defined entirely within base 103 and a second portion defined entirely in top cover 105, in which an output end of the first portion fluidly couples an input end of the second portion when top cover 105 is mated with base 103. In other embodiments, first air channel 10 is defined entirely within base 103. In various embodiments, the first portion of air channel 108 may be defined outside of and adjacent to the central chamber 101, such as by being defined on the external surface of sidewall 111 of central chamber 101.

In preferred embodiments, the piezoelectric transducer unit 190 is permanently installed in chamber 101 while a piezoelectric transducer 300 in piezoelectric transducer unit 190 is replaceable, as discussed in more detail below.

Output manifold 110 in top cover 105 includes second air channel 109 that fluidly couples output manifold 110 with central chamber 101. Air arriving into central chamber 101 from first air channel 108 pushes mist created by piezoelectric transducer unit 190 outside of humidifier 1 via second air channel 109 and directional output manifold 110.

Figure 7:
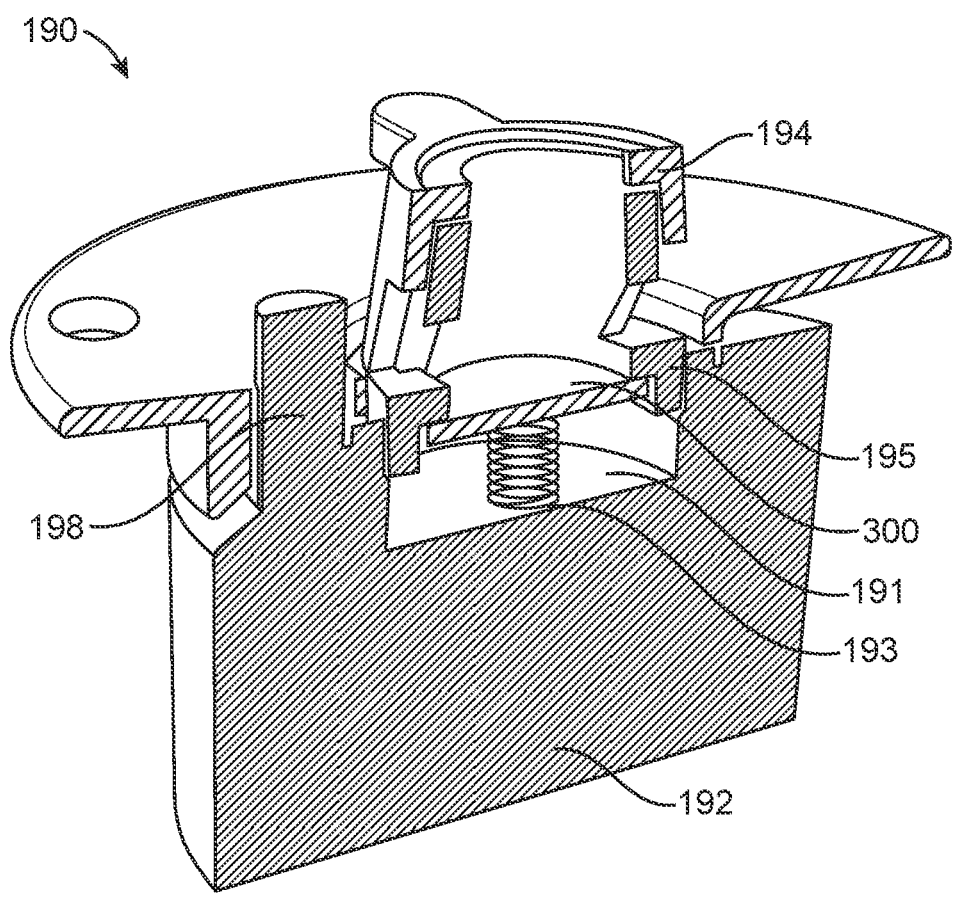
FIG. 7 is a cross-sectional view of a piezoelectric transducer unit housed within the piezo puck according to the first embodiment.
Figure 8:
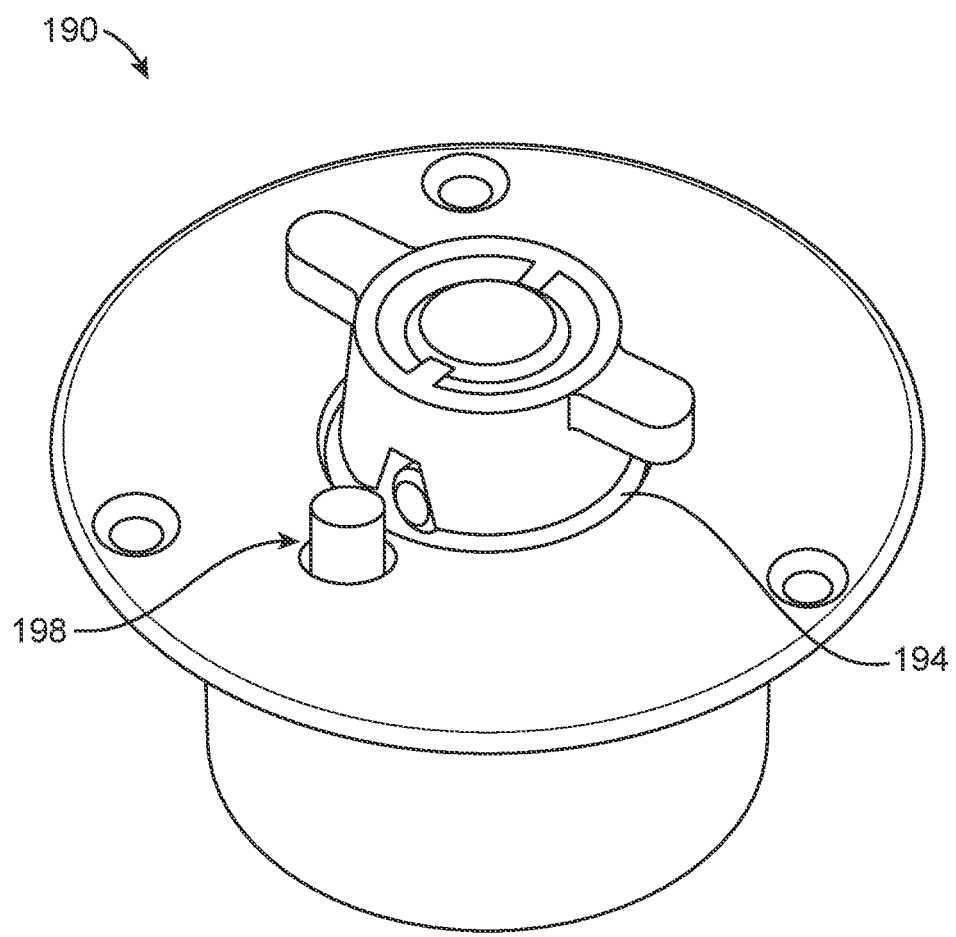
FIG. 8 is a perspective of the piezoelectric transducer unit shown in FIG. 7.

With further reference to FIGS. 7 and 8, piezoelectric transducer unit 190 includes a base 192 and a cap 194 removably connected to base 192. Any suitable removable connection may be employed, such as a threaded connection, a clip connection, pin and socket connection, or the like. Cap 194 is preferably in the form of a thumbscrew or the like so that a user may easily unscrew, or otherwise uncouple, cap 194 from base 192.

Figure 14:
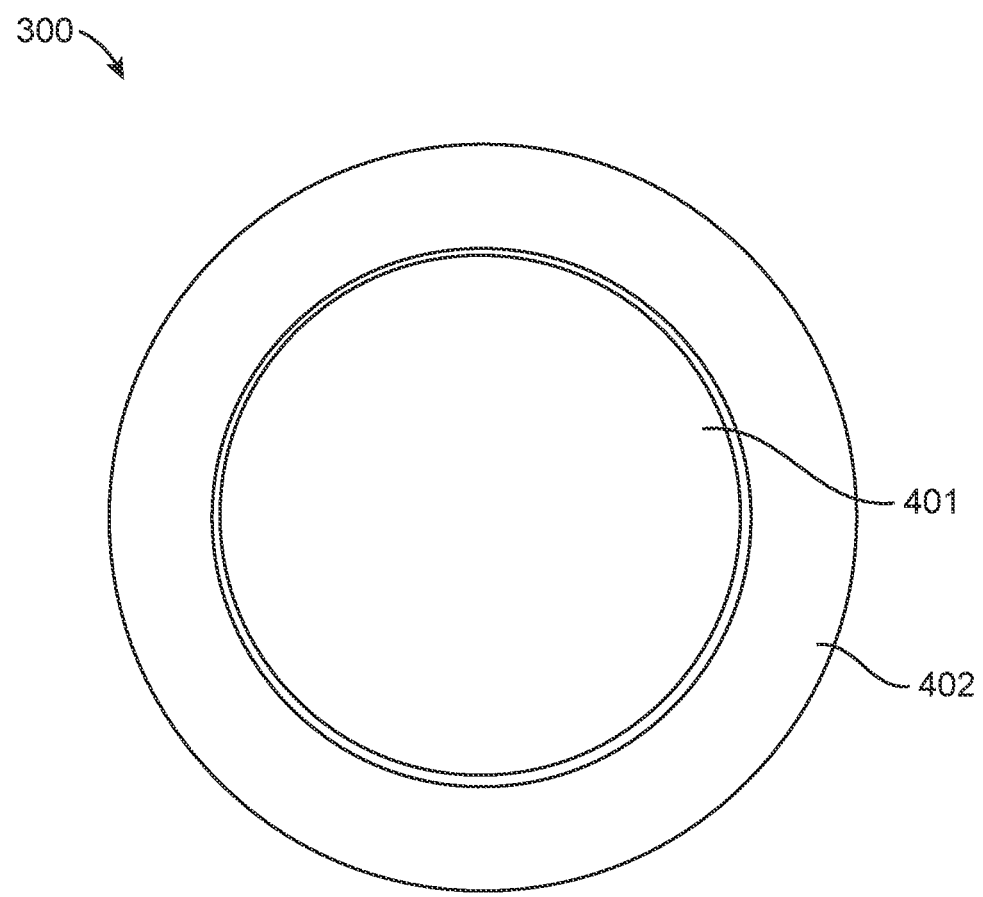
FIG. 14 is a bottom perspective of a piezoelectric transducer according to the first embodiment.

Piezoelectric transducer unit 190 includes piezoelectric transducer 300 for atomizing water. Piezoelectric transducer 300 is disposed in a cavity 191 within base 192 and held in position by cap 194. Piezoelectric transducer 300 is electrically coupled to one or more of electric connectors 104 to receive power from, and be controlled by, electrical control circuit 255. In a preferred embodiment, cavity 191 includes a spring 193 that biases piezoelectric transducer 300 against cap 194. Spring 193 is electrically coupled to one of the electric connectors 104 to provide power to piezoelectric transducer 300. Simply by uncoupling, such as by unscrewing, cap 194 from base 192, a user may easily remove and replace piezoelectric transducer 300. Ground connection for piezoelectric transducer 300 is created by placement in the appropriate spot, and is built into the base 192. For example, in various embodiments, a bottom side of piezoelectric transducer 300, as shown in FIG. 14, includes a power connection 401 and a ground connection 402. Power connection 401 may electrically connect via spring 193 and a corresponding electric connector 104 to electrical control circuit 255. Ground connection 402 connects by touching electricals couplings 195 on the side of base 192. Electrical couplings 195 may be connected to a corresponding electric connector 104 that provides ground for electrical control circuit 255.

Piezoelectric transducer unit 190 also includes water level sensor 198. Water level sensor 198 is electrically connected to electric connectors 104 to provide water level information of central chamber 101 to electrical control circuit 255 and a ground connection. Any suitable device may be used for water level sensor 198, such as a capacitive level sensor where the sensor and vessel form the two electrodes of a capacitor and changes in level causes a capacitance change; or alternatively, a magnetic float that rises and lowers with the water level which activates a reed magnetic switch or provides data via a hall sensor. Any other suitable sensor may be used, as known in the art.

Figure 9:
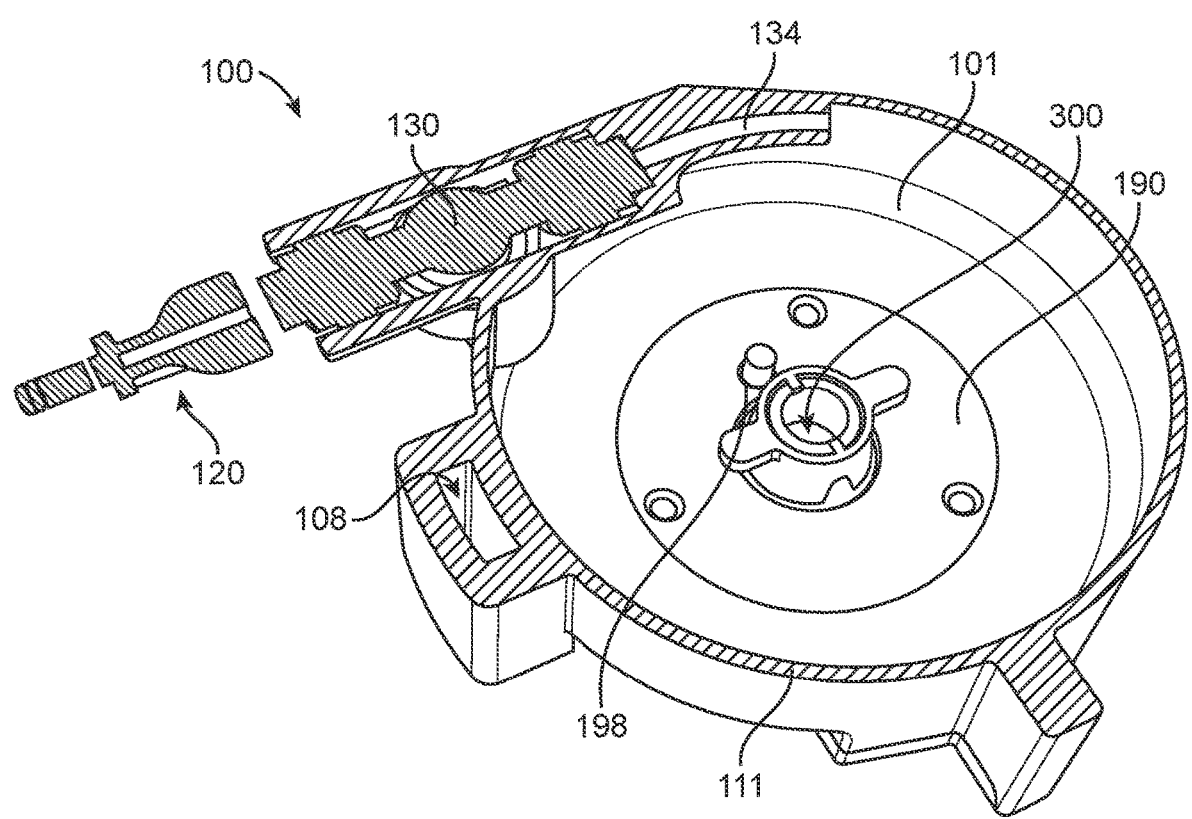
FIG. 9 is another cross-sectional view of the piezo puck according to the first embodiment.

With specific reference to FIG. 9, water obtained from quick disconnect 120 is controlled via valve 130 to flow through water channel 134 into central chamber 101. The sidewalls 111 of central chamber 101 are preferably made as smooth as possible to facilitate easy cleaning of piezo puck 100. Electrical control circuit 255 uses sensor data from water level sensor 198 to control valve 130 via valve control 132 and connection portion 232 of valve coupler 230 so that the amount of water in central chamber 101 is maintained within a predetermined height above piezoelectric transducer 300. A suitable range for water level is between 1 and 2 inches, with an ideal level averaging around 1.4 inches. Electrical control circuit 255 may use any suitable feedback control loop to control valve coupler 230 to maintain water level in central chamber 101 around the desired water level height. In some embodiments, electrical control circuit 255 may shut off power to piezoelectric transducer 300 if the sensed water level becomes too low so as to protect piezoelectric transducer 300 from damage. In other embodiments, two or more water level sensors may be used, such as one to detect low water events and one to detect when the water level is sufficiently high; each of which may have one or more corresponding electric connectors 104 for finally communicating with electric control circuit 255.

In a preferred embodiment, electrical control circuit 255 includes microprocessor 256 with built-in wireless connectivity, and humidity sensor 256. Any suitable wireless protocol may be employed, such as WiFi, Bluetooth, Zigbee, etc. Control circuit 255 includes memory that stores program code executable by processor 256 to control operations of humidifier 1, such as based upon input from the water level sensor or sensors 198, valve coupler 230, and wireless signals. Of course, other inputs are also possible, as known in the art, such as timing signals, and continuity signals (for example, as with respect to piezoelectric transducer 300 and/or water level sensor(s) 198), and the like. Checks for continuity can be used by control circuit 255, for example, to ensure that piezo puck 100 is properly mated to electronics puck 200 and accordingly control power to piezoelectric transducer 300 and/or raise alarms to the user via any suitable user interface, such as via wireless signaling or an indicator light on electronics puck 200.

In various embodiments, wireless connectivity allows for humidifier 1 to be entirely controlled by external interfaces, for example an application on a mobile phone or a website. Electronics puck 200 may also include user controls coupled to electrical control board 255 to allow a user to manually set operating parameters of humidifier 1, such as speed of air blower 250, humidity settings, timers to automatically turn humidifier 1 on and off at predetermined times and/or intervals, etc.

Preferably the user controls, regardless of where the controls are actuated, are configured to allow the user to specify a desired humidity level for the environment around humidifier 1 (either relative or absolute measure). In response, microprocessor 256 determines fan speed (i.e. voltage to provide to the air blower 250), adjust water level via turning the electric motor 220 on or off, and directly control humidity via turning the piezoelectric transducer 192 on or off.

Those skilled in the art will recognize that the present invention has many applications, may be implemented in various manners and, as such is not to be limited by the foregoing embodiments and examples. Any number of the features of the different embodiments described herein may be combined into a single embodiment, the locations of particular elements can be altered and alternate embodiments having fewer than or more than all of the features herein described are possible. Functionality may also be, in whole or in part, distributed among multiple components, in manners now known or to become known.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention. While there has been shown and described fundamental features of the invention as applied to being exemplary embodiments thereof, it will be understood that omissions and substitutions and changes in the form and details of the disclosed invention may be made by those skilled in the art without departing from the spirit of the invention. Moreover, the scope of the present invention covers conventionally known, future developed variations and modifications to the components described herein as would be understood by those skilled in the art.

What is claimed is:

1. A humidifier comprising:
a first housing comprising:
a first air inlet for accepting air;
a first air outlet;
a central chamber for holding water;
a piezoelectric transducer installed in the central chamber for atomizing water;
a first electrical connector electrically connected to the piezoelectric transducer;
a water inlet for accepting water and providing the water to the central chamber; and
a valve fluidly coupled to the water inlet for controlling a flow of water received from the water inlet;
wherein the first housing is configured to discharge humidified air from the first air outlet; and
a second housing removably connected to the first housing, the second housing comprising:
a second air outlet removably connectable to the first air inlet;
a forced air source for forcing air out of the second air outlet;
a second electrical connector configured to removably electrically connect to the first electrical connector; and
an electric circuit electrically coupled to the forced air source for electrically powering the forced air source and electrically coupled to the second electrical connector for electrically powering the piezoelectric transducer;
wherein the valve comprises a valve control for controlling flow of the water through the valve; and
the second housing further comprises a valve coupler configured to mechanically engage with and drive the valve control.

2. The humidifier of claim 1 wherein the piezoelectric transducer is removably installed in the central chamber.

3. The humidifier of claim 1 wherein the second housing further comprises a motor configured to drive the valve coupler, the motor electrically coupled to and controlled by the electric circuit.

4. The humidifier of claim 1 wherein the valve control and valve coupler have corresponding shapes to releasably engage with each other.

5. The humidifier of claim 1 wherein the second housing has a shape keyed to a shape of the first housing.

6. The humidifier of claim 1 further comprising a latch for releasably connecting the first housing to the second housing.

7. The humidifier of claim 1 wherein the water inlet comprises a quick disconnect for removably coupling to a water source.

8. The humidifier of claim 1 wherein the electric circuit is configured to control the motor according to a water level signal.

9. The humidifier of claim 8 wherein the first housing further comprises a third electrical connector and a water level detector, the water level detector configured to detect a level of water in the central chamber and output the water level signal on the third electrical connector according to the detected level of water, and the second housing further comprises a fourth electrical connector configured to removably electrically connect to the third electrical connector and provide the water level signal to the electric circuit.

10. The humidifier of claim 1 wherein the first housing further comprises a removable top cover to cover the central chamber, and the first air outlet is disposed on the top cover.

11. The humidifier of claim 10 wherein the first air outlet is movably disposed on the top cover.

12. The humidifier of claim 10 wherein the first housing and the top cover together define a first air channel for accepting air from the first air inlet and providing the air into the central chamber.

13. The humidifier of claim 12 wherein at least a portion of the first air channel is disposed on a sidewall of the central chamber.

14. The humidifier of claim 1 wherein the electric circuit comprises:
- a central processing unit programmed to control operations of the humidifier; and
- at least a power conditioner configured to accept power from an electrical power source and to output conditioned power suitable for use by the central processing unit, the forced air source, and the piezoelectric transducer.

15. The humidifier of claim 14 further comprising a wireless circuit for wirelessly communicating with an external device to control operations of the humidifier.

* * * * *